United States Patent [19]

Kresse, Jr. et al.

[11] Patent Number: 4,993,619
[45] Date of Patent: Feb. 19, 1991

[54] JOINT AND METHOD FOR SINGLE SIDE WELDING AND SELF-FIXTURING OF CLOSED STEEL SECTIONS

[75] Inventors: Alfred L. Kresse, Jr., Romeo; Gregory L. Nagel, Berkley, both of Mich.

[73] Assignee: General Motors Corporation, Detroit, Mich.

[21] Appl. No.: 569,486

[22] Filed: Aug. 20, 1990

Related U.S. Application Data

[63] Continuation of Ser. No. 386,669, Jul. 31, 1989, abandoned.

[51] Int. Cl.$^5$ .............................................. B23K 33/00
[52] U.S. Cl. ................................. 228/135; 228/173.6; 228/212; 403/272
[58] Field of Search .................... 228/135, 173.6, 212; 403/271, 272

[56] References Cited

U.S. PATENT DOCUMENTS

| | | | |
|---|---|---|---|
| 90,322 | 5/1869 | Vanstone | 228/173.6 |
| 90,332 | 5/1869 | Vanstone | 228/173.6 |
| 578,801 | 3/1897 | Wilmot . | |
| 1,484,579 | 2/1924 | Still . | |
| 1,773,068 | 8/1930 | Vienneau . | |
| 1,863,873 | 6/1932 | Quarnstrom . | |
| 2,330,207 | 9/1943 | England et al. | 113/120 |
| 2,619,574 | 11/1952 | Lambert | 219/10 |
| 3,301,992 | 1/1967 | Seeloff | 219/105 |
| 4,365,736 | 12/1982 | Stumm | 228/135 X |
| 4,756,069 | 7/1988 | Morikawa | 228/135 X |

Primary Examiner—Kenneth J. Ramsey
Attorney, Agent, or Firm—Charles H. Leahy

[57] ABSTRACT

Two sheet metal panels are joined together to form a closed box section structure. The two panels are individually stamped from a blank and each has a flange along one edge and a toothed edge of alternating notches and tabs along the opposite edge. The two panels are assembled in box section forming relationship with the flanges of the two panels abutting with one another and the toothed edges abutting with one another with the tabs of the one panel interdigitating with the tabs of the other panel. Clamps are applied to the panels and urge the interdigitating tabs into tight fitting relationship. Then the panels are welded together at the interdigitating tabs and also at the abutting flanges to form the closed box section structure. The toothed edges of the panels preferably extend generally normal to one another and the length of the tab is not substantially less than the length of the notch which receives the tab so that the interlocking tabs and notches align the panels longitudinally relative one another pending the welding together of the panels. The weld may be a single sided spot resistance weld, an arc weld, or a laser weld.

4 Claims, 3 Drawing Sheets

JOINT AND METHOD FOR SINGLE SIDE WELDING AND SELF-FIXTURING OF CLOSED STEEL SECTIONS

This is a continuation of Ser. No. 386,669, filed 7/31/89, now abandoned.

The invention relates to closed box section structures such as vehicle body windshield pillars and more particularly provides interlocking tabs acting between the abutting edges of two panels welded together.

BACKGROUND OF THE INVENTION

It is well known in the fabrication of motor vehicle bodies to provide a closed box section structure by welding together a pair of sheet metal panels. For example the windshield pillar of a vehicle body is typically constructed of a first panel and a second panel which are separately stamped into shapes which have flanges along the lateral edges which fit together and define a closed hollow box section. The flanges overly one another and are conventionally pinch welded together. The flanges must have a sufficient width to provide a clamping surface by which the flanges may be clamped together. Furthermore, the width of the flange must be sufficient to receive the spot weld which attaches the two flanges together.

A disadvantage of the aforedescribed pillar construction is that the flanges project outwardly from the closed box section and thereby add to the dimension of the windshield pillar which in turn affects the aesthetics of the vehicle.

It would be desirable to provide a method by which two stamped panels could be joined into a closed box section without the disadvantage of a flange projecting from the finished structure.

SUMMARY OF THE INVENTION

According to the present invention two sheet metal panels are joined together to form a closed box section structure. The two panels are individually stamped from a blank and each has a flange along one edge and a toothed edge of alternating notches and tabs along the opposite edge. The two panels are assembled in box section forming relationship with the flanges of the two panels abutting with one another and the toothed edges abutting with one another with the tabs of the one panel interdigitating with the tabs of the other panel. Clamps are applied to the panels and urge the interdigitating tabs into tight fitting relationship. Then the panels are welded together at the interdigitating tabs and also at the abutting flanges to form the closed box section structure. The toothed edges of the panels preferably extend generally normal to one another and the length of the tab is not substantially less than the length of the notch which receives the tab so that the interlocking tabs and notches align the panels longitudinally relative one another pending the welding together of the panels The weld may be a single sided spot resistance weld, an arc weld, or a laser weld.

Accordingly, the object feature and advantage of the invention resides in the method of welding together a pair of preformed panels in which the panels have flanges along one edge abutting with one another and toothed edges along the other edge of the panels comprised of tabs on the one panel which interlock into opposing notches in the other panel to align and retain the panels relative one another during subsequent welding together of the panels at the edges thereof.

Another feature, object and advantage of the invention resides in the provision of a closed box section structure for a vehicle body in which the traditional pinch weld flange of substantial width is replaced by interlocking tabs and notches provided along one edge of the two panels and interlocking with one another to be welded together.

BRIEF DESCRIPTION OF THE DRAWINGS

These and other object, features and advantages of the invention will become apparent upon consideration of the description of the preferred embodiment and the appended drawings in which.

DESCRIPTION OF THE PREFERRED EMBODIMENT

Figure 1:
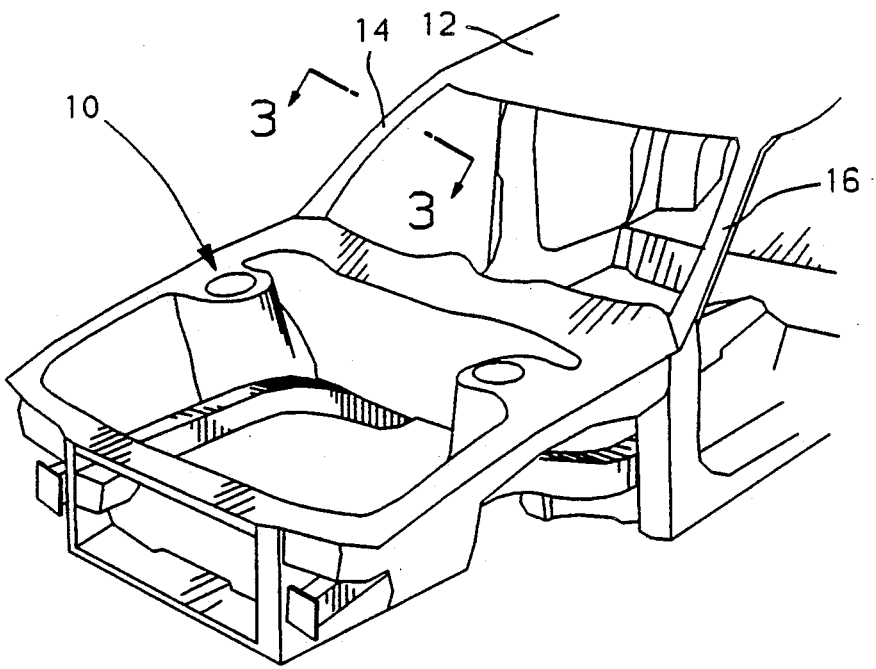
FIG. 1 is a perspective view of a vehicle body structure.

Referring to FIG. 1 there is shown a motor vehicle body generally indicated at 10 and comprised of stamped sheet-steel members which are welded together. The vehicle body includes a roof 12 and windshield pillars 14 and 16. The pillars are formed by welding together an outer panel and an inner panel to form a closed box section member.

Figure 2:
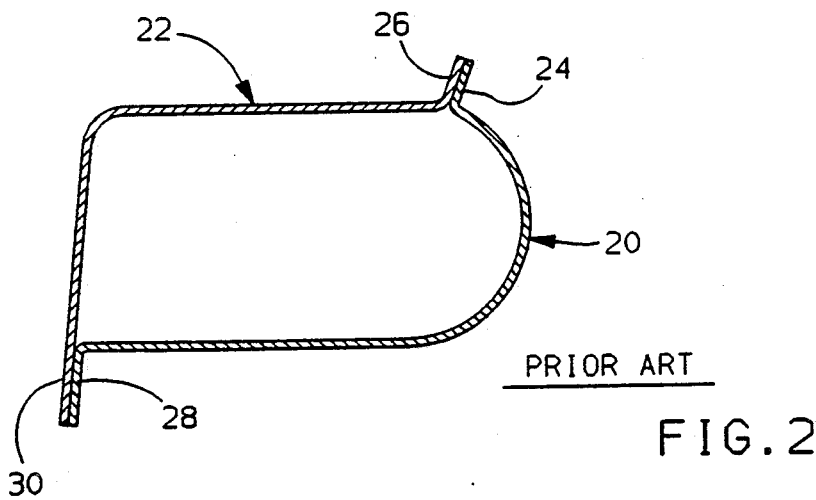
FIG. 2 is sectional view taken through the windshield pillar of a prior art vehicle body showing the degree to which the pinch weld flange adds to the dimension of the pillar.

FIG. 2 shows a prior art windshield pillar construction including inner panel 20 and outer panel 22. The inner panel 20 has a flange 24 along one edge thereof which abuts with a similar flange 26 along the lateral edge of the outer panel 22 The flanges 24 and are connected together by spot welds provided at intervals along the length of the flanges. The weatherstrip from the door is mounted on the flanges 24 and 26.

The other lateral edge of the inner panel 20 has a flange 28 which overlies a flange 30 of the outer panel 22. Flanges 28 and 30 are connected together by spot welds provided at intervals along the flanges. As seen in FIG. 2, the welding together of the flanges of the inner panel 20 and the cuter panel 22 provide a closed box section. Furthermore, as seen in FIG. 2, the flanges necessarily project from the confines of the closed box section and accordingly determine the overall width of the pillar structure. It is desirable to limit the dimension of the flanges to the maximum extent possible, however, a substantial flange width is required in order to clamp the flanges together for welding and in order to receive the spot welds along the length of the flanges.

Figure 3:
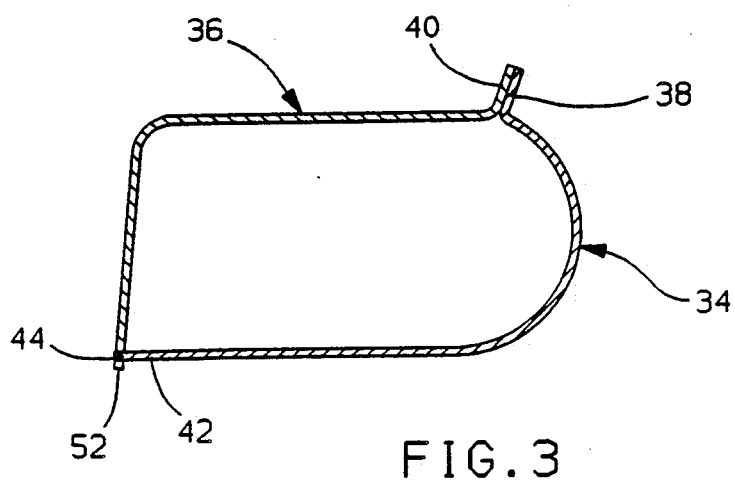
FIG. 3 is a sectional view taken in the direction of arrows 3—3 of FIG. 1 through the windshield pillar constructed according to the present invention.

FIG. 3 shows the pillar of the present invention. The inner panel 34 and the outer panel 36 respectively have flanges 38 and 40 which abut one another and are welded together The opposite lateral edges of the inner panel 34 and outer panel 36 are welded together without a flange structure projecting therefrom as shown in FIG. 3 so that the overall dimension of the pillar structure is less than the prior art construction of FIG. 2

Figure 4:
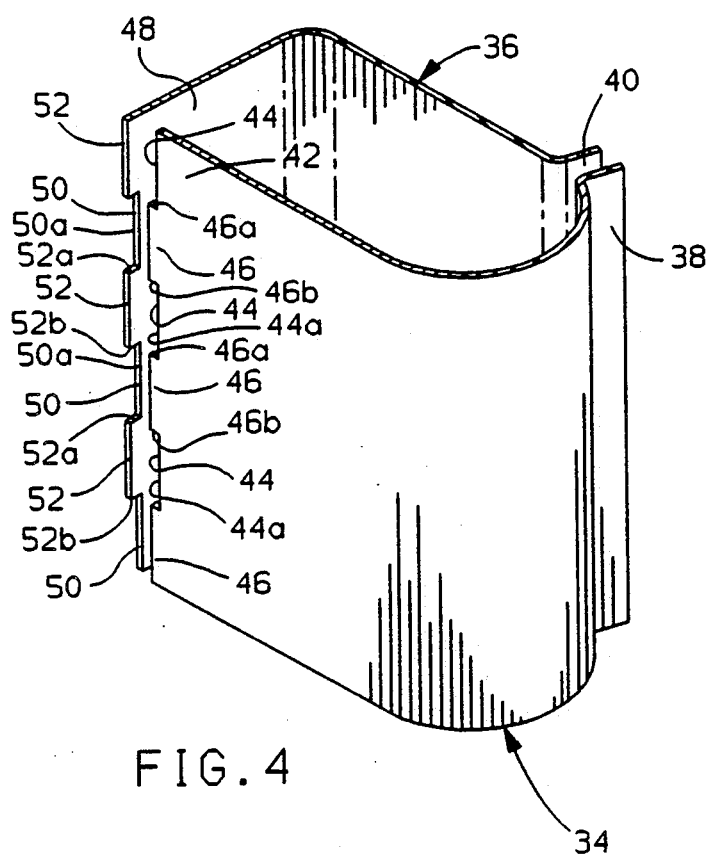
FIG. 4 is a perspective view of the windshield pillar of the present invention prior to the welding together of the separately stamped panels to define a closed box section pillar structure.
Figure 5:
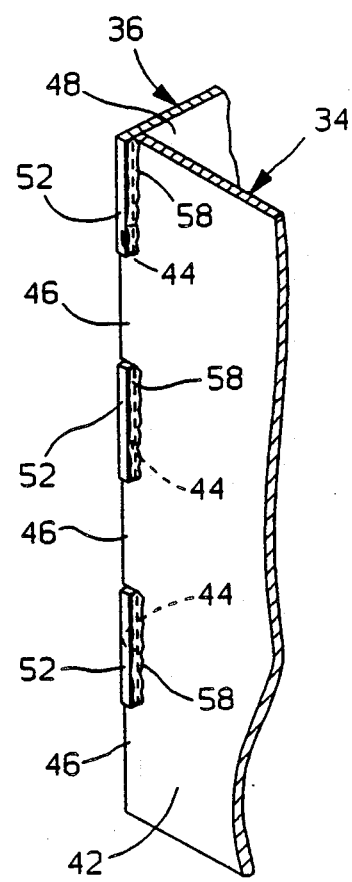
FIG. 5 is a partial fragmentary view of the panels of FIG. 4 shown with the panels positioned with the tabs and notches interlocking together and connected by arc welds.

Referring to FIG. 4 it is seen that the inner panel 34 has notches 44 along the length of the edge 42 thereof which define projecting tabs 46. The outer panel 36 lateral edge portion 48 has notches 50 spaced along the length of the lateral edge 48 thereof to define tabs 52. The tabs 46 of inner panel 34 are staggered with respect to the tabs 52 of the outer panel 36 so that the panels fit together as shown in FIG. 5 with the tabs 46 of inner panel 34 fitting into the notches 50 of the outer panel 36. Likewise, the tabs 52 of the outer panel 36 fit into the notches 44 of the inner panel 34.

Referring again to FIG. 4 it is seen that the tabs and the notches are rectangular in shape and that the tabs 46 of the inner panel 34 have edge walls 46a and 46b which define length of the tabs 46 and the length of the notches 44. The notch 44 has a bottom wall 44a which defined the depth of the notch 44. Tabs 52 have edge walls 52a and 52b. Notch 50 and bottom wall 50a. The tabs 46 of inner panel 34 have substantially the same length as the length of the notches 50 in the outer panel 36. Likewise the tabs 52 of the outer panel 36 have a length equal to the notches 44. Accordingly, with the tabs interlocked in the notches of the opposing panel, the panels are fixedly located relative one another in the longitudinal direction. In addition, it is seen that the notches 50 and 44 have a depth which is approximately the same or somewhat greater than the thickness of the sheet steel used to make the inner panel 34 and outer panel 36.

Furthermore, as shown in FIG. 5, the interlocking of the panels with the tabs seated tightly at the bottom of the notches reliably locate the two panels relative to one another to prevent the panels from moving inwardly relative one another. Furthermore, as seen in FIG. 5, the tabs 52 have a length greater than the thickness of the sheet steel of the inner panel 42 to provide a niche in which a bead of weld 58 may be applied to permanently affix the two panels together. The flanges 38 and 40 at the opposite lateral edges of the inner panel 34 and outer panel 36 are conventionally joined together by spot welds along the length thereof.

Figure 6:
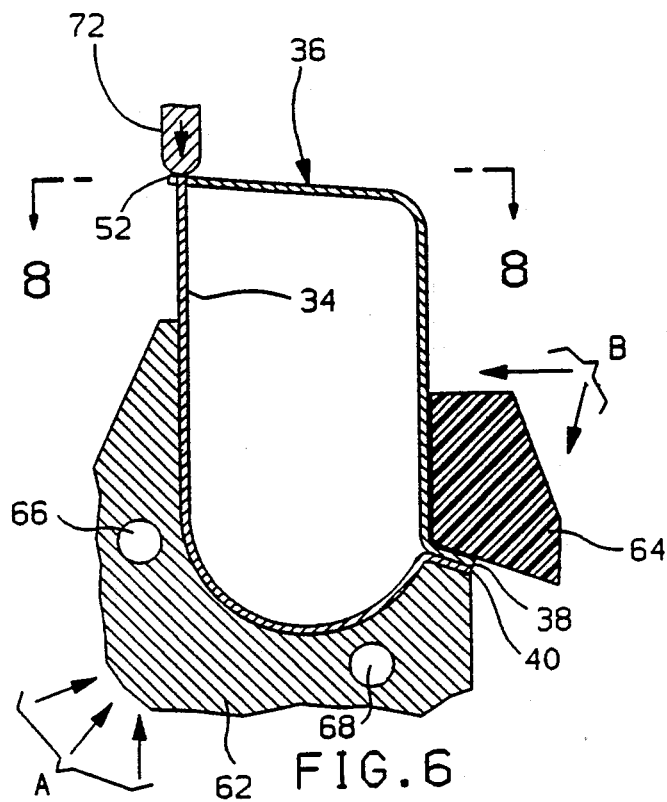
FIG. 6 shows the panels being clamped together and welded by a spot welder.

FIG. 6 shows the inner panel 34 and the outer panel 36 being joined together by a resistance welder. A clamp 62 and a clamp 64 act respectively on the inner panel 34 and the outer panel 36 to clamp the panels together with the tabs and notches in interlocking relationship. As seen in FIG. 6 the clamp 62 applies force in the direction of arrows "A" and the clamp 64 applies force in the direction of arrows "B" so that the notches and tabs of the two panels are retained in tight fitting interlocking relationship with one another. The clamp 62 is a backup electrode and has water cooling channels 66 and 68. The clamp 64 is an electrically non-conductive clamp and is preferably constructed of Fiberglass.

Figure 8:
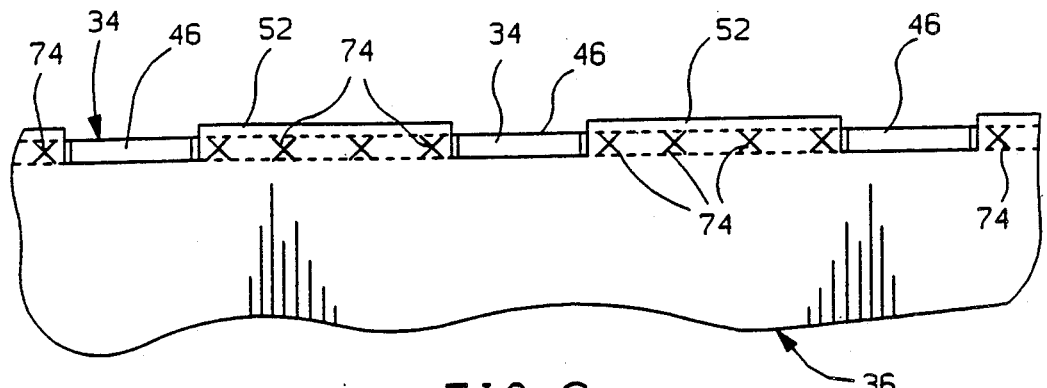
FIG. 8 is a view taken in the direction of arrows 8—8 of FIG. 6 and showing the panels connected by the resistance spot welding.
Figure 9:
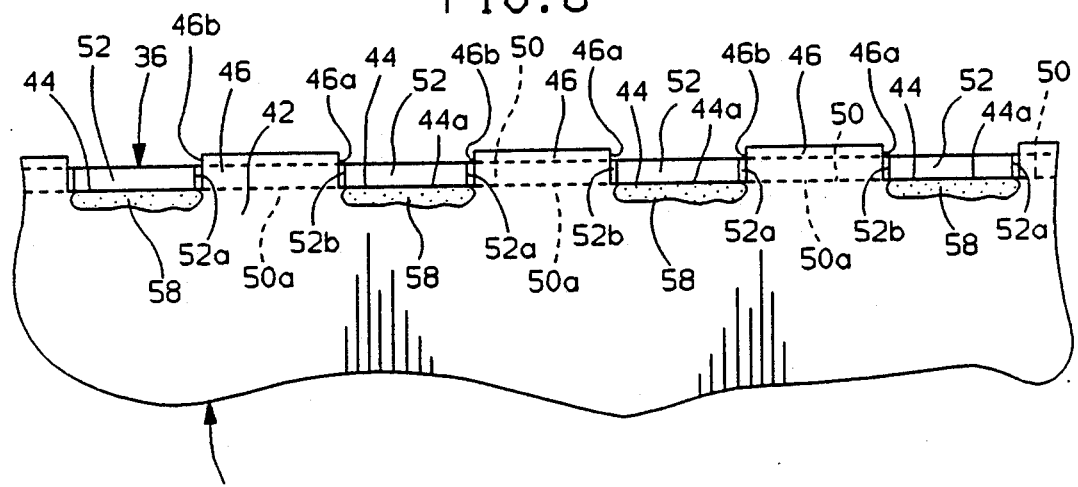
FIG. 9 is a view showing the panels connected together by arc welding similar to FIG. 5.

To weld the inner panel 34 and outer panel 36 together, a primary electrode is engaged with the outer panel 36 and provides a series of spot welds along the length of the pillar. As best seen in FIG. 8 the spot welds 74 are provided along the tabs 52 and fuse the tabs 52 to the bottom wall of the notches of the inner panel 34. Alternatively, the spot welds could be applied along the tabs 46. After the outer and inner panels are welded together along the interlocking tabs and notches, the clamps 62 and 64 are removed and the flanges 38 and 40 are conventionally welded together by resistance spot welds along the lengths thereof.

Figure 7:
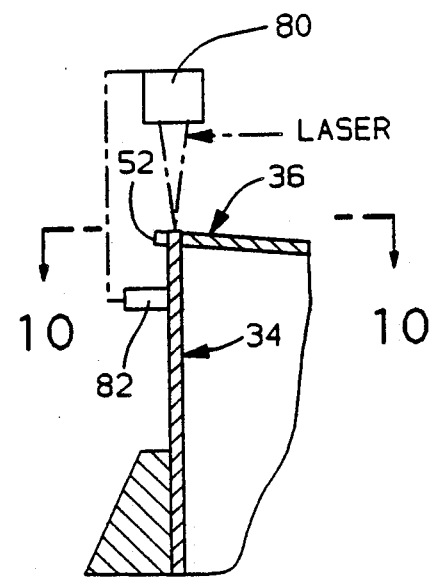
FIG. 7 shows the panels clamped together and being welded by a laser welder.
Figure 10:
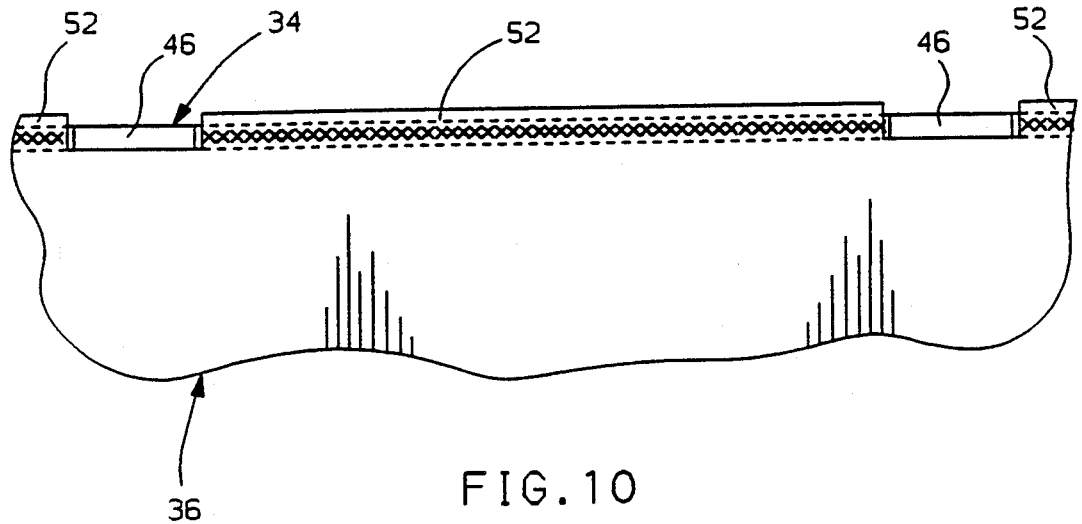
FIG. 10 is a view taken in the direction of arrows 10—10 of FIG. 7 showing the panels connected together by laser welding.

Referring to FIG. 7 it is seen that the panels can also be welded together by a laser weld. The laser 80 is guided by a probe 82 which senses the location of the inner wall 34 beneath the outer wall 36 and controls the location and movement of the laser 80. The laser 80 is preferably of the type having a mirrored beam delivery system 80 and fuses the tabs 52 into the bottom wall of the notches as seen in FIG. 10. FIG. 10 shows that the tabs 52 may have a relatively longer length than the mating tabs 46 of the inner panel 34 so as to increase the length of the weld acting between the two panels.

It will be understood that the panels may be first welded together at either the pinch weld flange 38, 40, or at the opposite edge having the interlocking tabs and notches. In either case, the clamping of the parts will force the tabs into the required tight fitting relation in the notches of the opposite panel and also position the flanges in abutting relationship with one another. Although the drawings show each tab having the same length as the corresponding notch, it is sufficient if at least one of the tabs fits tightly in its notch in order to align the panels longitudinally with respect to one another.

Thus it is seen that the invention provides a new and improved closed box section structure for vehicle body, and a method for the assembly of a pair of panels to comprise a closed box section.

The embodiments of the invention in which an exclusive property or privilege is claimed are defined as follows:

1. A method of joining together two sheet metal panels to form a closed box-section structure, comprising:
    stamping each of the two panels to provide a flange along one edge of each panel and a toothed edge of alternating notches and tabs along the other edge of each panel,
    assembling the two panels in box-section forming relationship with the flanges of the two panels abutting one another and the toothed edges abutting one another with the tabs of the one panel interdigitating with the tabs of the other panel,
    clamping the two panels to retain the interdigitating relation of the tabs and to retain the flanges in abutting relationship,
    and welding the panels together at the interdigitating tabs and at the flanges to form a closed box-section structure.

2. The method of claim 2 in which a first electrically conductive clamp contacts one of the panels and a second electrically non-conductive clamp contacts the other panel.

3. A method of joining together two sheet metal panels to form a closed box-section structure, comprising:

stamping each of the two panels to provide a flange along one edge of each panel and a toothed edge of alternating rectangular shaped notches and tabs along the other edge of each panel, assembling the two panels in box-section forming relationship with the flanges of the two panels abutting one another in overlying relationship with one another and with the toothed edges abutting one another with the tabs interlocking into the opposing notch of the abutting panel, clamping the two panels to retain the interlocking relation of the tabs in the notches and to retain the flanges in abutting relationship, and welding the panels together at the interlocking tabs and notches and at the flanges to form a closed box-section structure.

4. The method of claim 3 in which the toothed edges of panel extend generally normal to one another and the length of at least one of the tabs is not less than the length of the notch which receives the tab so the interlocking tab and notch align and maintain the position of the panels relative one another prior to the welding together of the panels.

* * * * *